Feb. 11, 1936.  J. W. LONG ET AL  2,030,821
PAGE PROJECTOR FOR RECORDERS
Filed Feb. 20, 1931  3 Sheets-Sheet 2

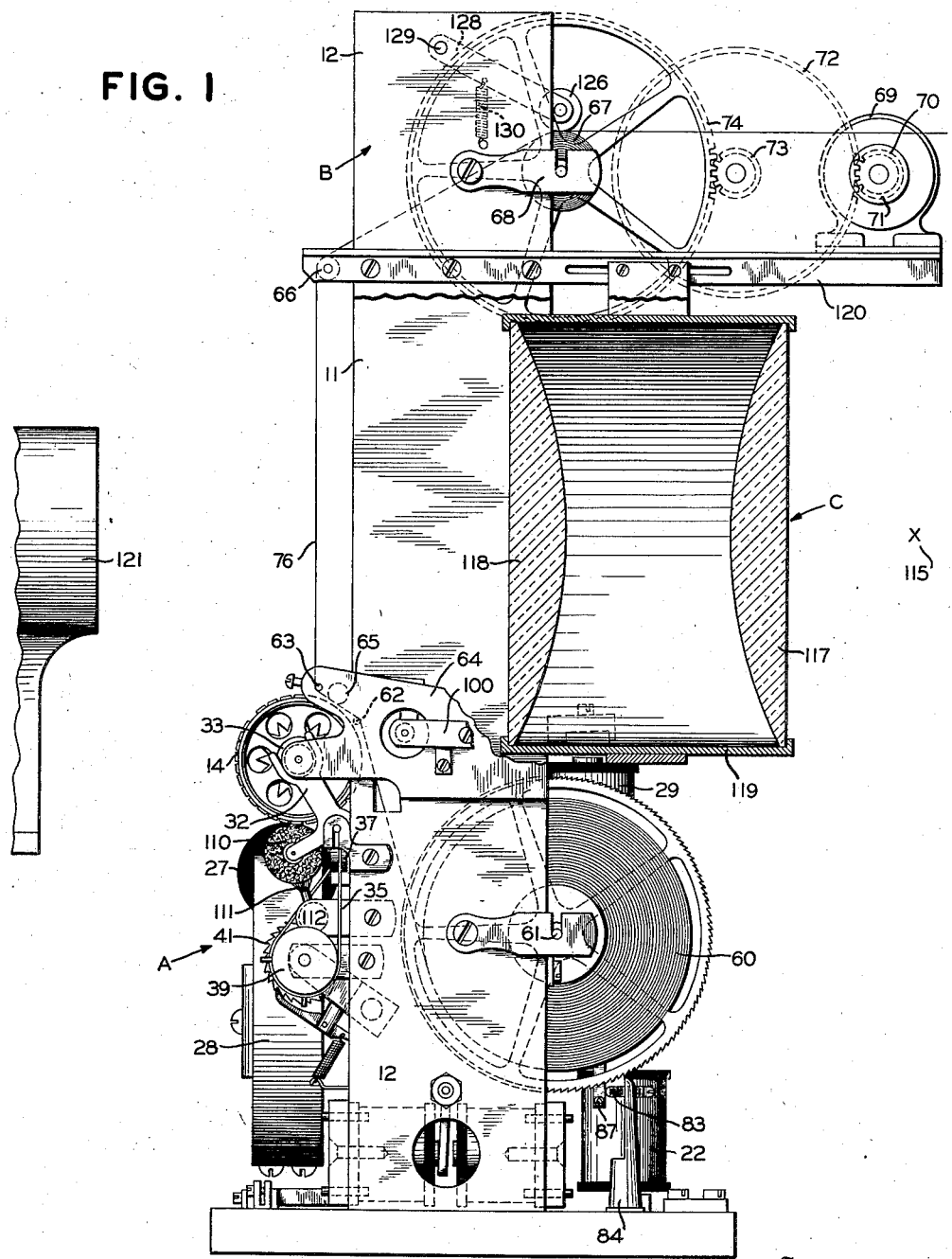

Inventors
J.W. LONG
E.R. WHEELER
By their Attorney
Eugene C. Brown

Feb. 11, 1936.    J. W. LONG ET AL    2,030,821
PAGE PROJECTOR FOR RECORDERS
Filed Feb. 20, 1931    3 Sheets-Sheet 3

Inventors
J. W. LONG
E. R. WHEELER
By their Attorney
Eugene C. Brown

Patented Feb. 11, 1936

2,030,821

UNITED STATES PATENT OFFICE 2,030,821

PAGE PROJECTOR FOR RECORDERS

James W. Long, Plainfield, and Evan R. Wheeler, North Plainfield, N. J., assignors to The Western Union Telegraph Company, New York, N. Y., a corporation of New York Application February 20, 1931, Serial No. 517,353

7 Claims. (Cl. 88—24)

This invention relates to a printing telegraph projector and more particularly to a page printing telegraph apparatus and associated projecting mechanism for displaying on a suitable screen news items and other information, in enlarged characters.

Various arrangements have been proposed heretofore for projecting a continuous or traveling line of information, such as stock quotations, from a tape telegraph printer or ticker, and in all of such systems, as far as we are aware, there is always an appreciable lag, corresponding to a considerable length of tape, between the printing of a character and its appearance on the screen. This is due to the fact that the printing position of the ticker is so located as to require the tape to be moved a considerable distance beyond the printing position in order to bring each printed character into the field of the projector. Obviously, if the transmission is interrupted at any time, the information contained on the tape between the printer and the projector will not appear on the screen until after the transmission is again resumed. It will be apparent moreover that unless an unduly long screen is provided, which is impractical because of projection difficulties, the amount of information which will be visible at any instant is quite limited.

In order to increase the amount of printed matter visible at any instant on a screen of moderate dimensions, it has been proposed to project from the web of a page printing telegraph machine. However, this would greatly increase the lag between printing and projecting, over that incident to tape projection, since it is necessary, with commercial page printers as heretofore constructed, to complete a relatively large number of lines of printing, in order to move a line clear of the machine and into the field of a projector. This also leaves a corresponding number of lines of printed matter unprojected upon any discontinuance of the telegraph transmission. The resulting interruption of the projection of various items before their completion is annoying and constitutes a severe limitation on the use of such a projecting scheme.

One of the objects of the present invention is to overcome these difficulties and to provide a printing telegraph projector of the page or successive line type, in which each line, as soon as it is completed, will move immediately into the field of the projector.

Another object is to provide a page printing telegraph projector in which any desired number of lines may be simultaneously projected and in which there will be no lag between the printing or a line and its appearance on the screen.

Various other objects and advantages will appear from the following detailed description of our invention, reference being had to the accompanying drawings, in which:

Figure 1 is a side view partly in section of a page printing telegraph projector embodying the present invention;

Figure 3:
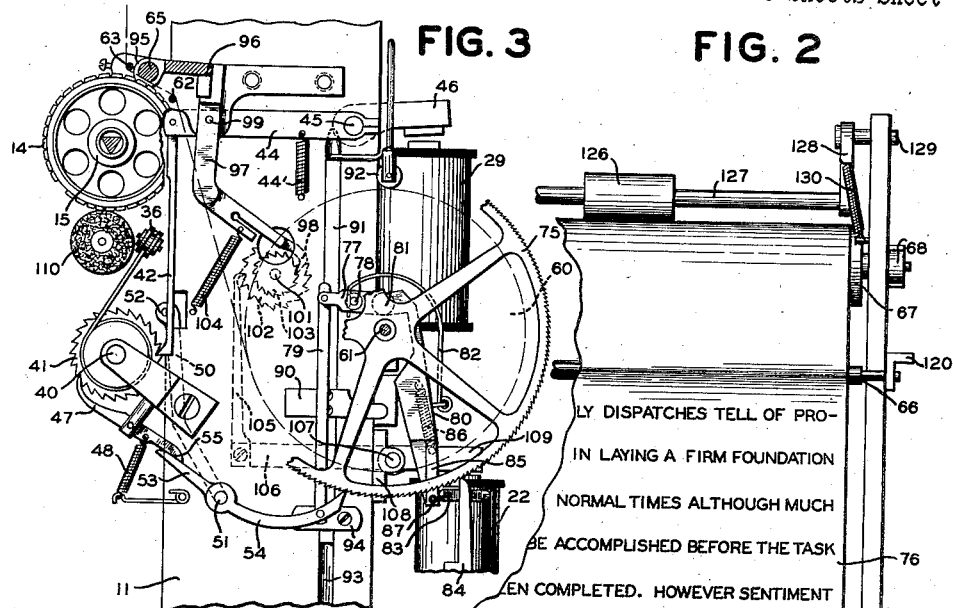
Figure 3 is a sectional view approximately on the line 3—3 of Figure 2.
Figure 2:
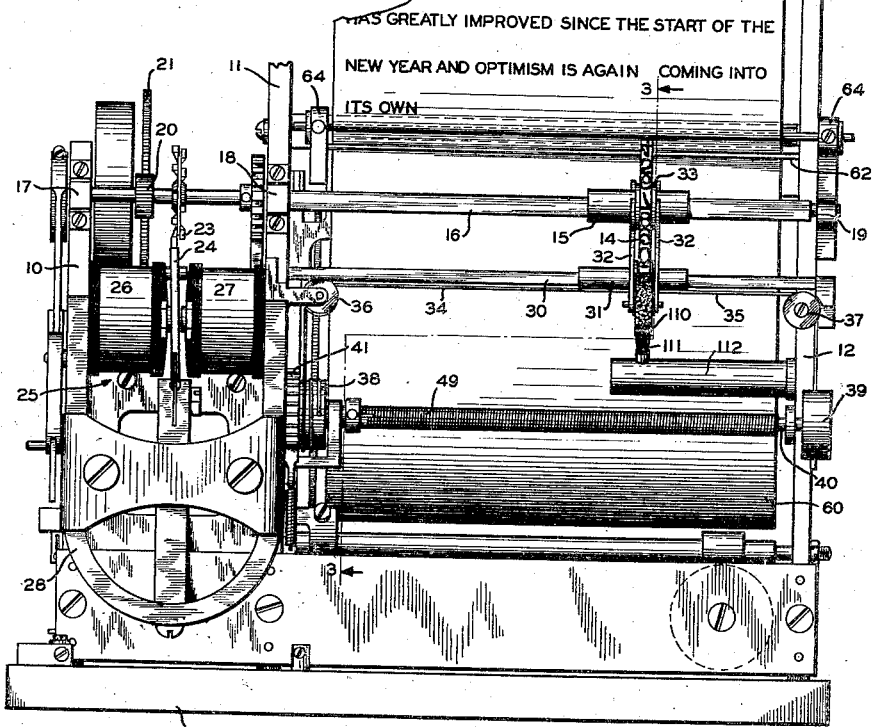
Figure 2 is a front elevation of the apparatus shown in Figure 1.

Referring first to Figures 1, 2, and 3, we have shown a page printing telegraph projector comprising a printing mechanism A, paper takeup mechanism B spaced thereabove, and a projecting system C, interposed between the printing mechanism and takeup mechanism. The invention is shown with special reference to a page ticker of the Burry type, such as that disclosed in United States Patent No. 680,693, of August 20, 1901, although it is to be understood that the invention is not limited to recorders of this type, but may be employed with recorders of other forms, such as type bar printers, chemical recorders, etc.

The complete Burry page printer is not shown, since it is well known in the art, but only so much thereof is included, together with the modifications thereof made in accordance with the preferred embodiment of the invention, as is necessary for a complete understanding of the invention.

The operative parts of the printing telegraph machine are conveniently arranged on or between three vertical plates or frames 10, 11, and 12 (Fig. 2), which are mounted on a suitable base 13 preferably of insulating material.

The type by which the printing is done are arranged on the periphery of a type wheel 14 fixed to a hub 15, slidably mounted on a triangular shaft 16, journalled in brackets 17, 18 and 19, on the frame plates 10, 11 and 12, respectively.

The shaft is rotated to bring any desired character to the printing point, and the type wheel is moved along the shaft, step by step, to effect the letter spacing.

For the purpose of rotating the shaft, it is provided between the frame plates 10 and 11 with a pinion 20, meshing with a gear 21 driven by a coiled spring (not shown) which is kept under tension by line signals through a magnet 22, as is well known to those familiar with this type of printer.

The rotation of the shaft 16 and the type wheel 14 is made step by step by means of an escapement wheel 23 fixed on the shaft 16. The escapement wheel has staggered teeth on opposite sides of its periphery and co-operates with a vibrating tongue 24, constituting the armature of a polarized magnet 25, composed of two coils 26 and 27 and a permanent magnet 28 secured to the frame plates 10 and 11. Currents of different polarity flowing through the coils will therefore cause the tongue 24 to vibrate, thereby releasing the escapement wheel and allowing the type wheel and shaft to rotate step by step to bring the desired character to the printing point.

A magnet 29 provides the motion for shifting the type wheel along the shaft 16 to effect the letter spacing, as will now be explained.

Below the type wheel shaft 16 is a second triangular shaft 30 journalled in the frame plates 11 and 12 in such a manner as to permit slight movement of rotation, and carrying a sliding sleeve 31 provided with arms 32 extending upwardly into engagement with an enlargement 33 of the type wheel hub 15 on opposite sides thereof, so that the type wheel can rotate with its shaft but will move axially on the shaft as the sleeve 31 is shifted across the machine. This sleeve is connected to two cords 34 and 35 extending in opposite directions over pulleys 36 and 37 to winding drums 38 and 39, so that the sleeve and with it the type wheel, will be drawn to the right or left according to the direction of rotation of the drums.

The drums 38 and 39 are fixed on a shaft 40 on which a ratchet wheel 41 is also fixed. This ratchet is actuated, clockwise as viewed in Figures 1 and 3, by a hooked pawl 42 pivoted at its upper end to an arm 44 rigid with a shaft 45 to which the armature 46 of the magnet 29 is secured. When the armature 46 is depressed, the consequent upward swing of arm 44 raises the pawl 42 past one tooth on the ratchet, and when the arm 44 is pulled down by the retractile spring 44', the downward thrust of the pawl 42 turns the ratchet 41, and with it shaft 40, and winding drums 38 and 39, through an angle equal to the width of one tooth, thus shifting the type wheel a distance equal to one letter space along the shaft 16. Backward movement of the ratchet is prevented by a holding pawl 47 normally held in engagement with the ratchet by a light spring 48. The rightward travel of the type wheel serves to apply tension to the spring 49 coiled around the shaft 40, for the purpose of returning the type wheel to initial position to the left of the frame at the completion of each line. It will therefore be seen that if at any time the pawls 42 and 47 are simultaneously disengaged from the ratchet 41, the spring 49 will instantly revolve the drums 38 and 39 in the opposite direction, thus winding the cord upon the drum 38 and unwinding it from the drum 39 so as to return the type wheel to its initial position.

The return of the type wheel to its initial position should take place from any desired point in the type wheel's path, at the will of the sending operator. The pawl 42 and detent 47 are thrown out of engagement with the ratchet wheel 41 for this purpose by means of an arm 50 fixed on the shaft 51 and having a pin 52 which engages with pawl 42, and by an extension 53 of a detent 54 which engages beneath the tail 55 of the detent 47 when the shaft 51 is turned clockwise, thus freeing the shaft 40 and permitting the spring 49 to exert the power stored therein to reverse the travel of the type wheel. The mechanism for operating the shaft 51 is fully disclosed in the aforesaid Burry patent and therefore is not shown herein.

The paper on which the printing is done is preferably in the form of a continuous strip wound into a roll 60 carried on a spindle 61 removably mounted in suitable bearings carried by the plates 11 and 12. From the roll the paper passes upwardly over roller 62 and beneath roller 63, both of which are journalled in plates 64 carried by the side frames 11 and 12. The paper passes between the type wheel 14 and the printing bar or plates 65, and continues vertically upward from the roller 63 to a roller 66, and thence across a tensioning roller 67, mounted in brackets 68 carried by the side plates 11 and 12. From the roller 67, the web may pass to any suitable winding mechanism, not shown. The roller 67 is maintained under constant rotative force by a constantly running motor 69 having a friction or slip clutch 70 geared by the gears 71, 72, 73, and 74 to the roller 67.

A pressure roller 126 engages the web substantially centrally thereof and holds it in engagement with the roller 67. The roller 126 is mounted on a shaft 127, journalled in spaced arms 128 pivoted at 129 to the side plates 11 and 12. A coiled spring 130 urges the roller 126 into contact with the roller 67.

With the relatively wide web required for page projection, it is necessary to maintain the web perfectly taut and even through the field of the projector. Difficulty has been experienced in obtaining the required evenness of feed when the tension is applied to the web at each side or continuously across the roller 67, due to slight misalignment of the rollers 63 and 67. It has been found, however, that when the pressure roller 126 is applied to the central zone only, of the web, that the web will be advanced evenly across the projection field.

The lower roll 60 is normally held against rotation by the pawl 54 engaging in the teeth of the ratchet wheel 75 carried by the roll 60.

It is obvious that the paper should be advanced one step at each return of the type wheel to its left hand or initial position. The ratchet wheel 75 and the detent 54 form part of an escapement mechanism by means of which the web 76 is permitted to be unwound from the roll by the pull exerted thereon by the motor 69 whenever the type wheel is returned to its initial position. A lever 77 is pivoted intermediate its ends on a pin 78 projecting from the side of plate 11 and is connected with the detent 54 by a link 79. The rear end of the lever 77 has an arm 80 pivoted thereto at 81, and a spring 82, fastened to the lever 77 and hooked to the arm 80, acts to move the arm in a plane parallel to the plane of the wheel 75 and away from the detent 54. A stop screw 83 adjustable in a standard 84 rising from the base 13, serves to limit the rearward motion of the arm 80 under the influence of spring 82. The arm 80 has a slotted lower end and a pawl carrier 85 is guided vertically in said slot and is held upward by a spring 86. The working tooth 87 on the carrier 85 is normally out of engagement with the teeth of the wheel 75. Whenever the shaft 51 is rocked clockwise, the detent 54 is removed from engagement with the wheel 75 and through the link 79, lever 77, arm 80, and spring 86, the pawl 87 is drawn up into engagement with the teeth of wheel 75. The detent 54 by this same movement is not fully withdrawn from engagement with the wheel 75 until after the pawl 87 engages therewith. As soon as detent 54 releases the wheel 75, the web 76 is drawn upward by the action of the motor 69 until the arm 80 is arrested by engagement with a stop member 90.

Inasmuch as the roll decreases in size as the paper is drawn therefrom, it is necessary that the pawl 87 have a variable throw in order that the lines of printing may be uniformly spaced upon the paper. The means for governing the motion of the pawl 87 circumferentially of the wheel 75 is controlled by the diameter of the roll, so that as the roll decreases in size, the throw of the pawl increases. The stop member 90 is mounted upon a slide 91, which has an arm 92 adapted to rest on the top of the paper. The slide 91 moves in a vertical groove 93 in the side of the plate 11, and is held in place by one or more bars 94.

The slide 91 and its stop arm 90 move in a vertical line while the surface of the arm 80, which co-acts therewith, is inclined to the vertical so that as the stop arm 90 moves down, the arm 80 has more throw before it is arrested by the stop arm 90, and thus the feeding of the paper is substantially uniform as the diameter of the roll decreases.

The platen comprises a metal bar 65 flattened on one side and carried between a pair of ears 95 (one only being shown) at opposite ends of the bar 96 which extends transversely across the machine. At one end the bar 96 has an arm 97 attached thereto, the arm being bent at right angles and passing through an aperture in the plate 11 and being provided at its end with a tooth or pawl 98. The platen assembly is pivoted to plate 11 by a pin 99 and is pivoted at a corresponding point at the opposite side of the machine in an adjustable bracket 100 carried by the plate 64, which in turn is secured to the side plate 12. A shaft 101 journaled in the plate 11 is provided with two ratchet wheels 102 and 103, each having an equal number of teeth. The ratchet wheel 103 co-acts with the pawl 98 to lift the arm 97 and thus to propel the platen against the type wheel against the tension of a spring 104. The ratchet 102 is actuated at suitable times by means of a pawl 105 pivotally connected to a lever 106 fast on a shaft 107, journaled in brackets 108. Shaft 107 has an arm 109 fast thereto, carrying the armature of the magnet 22.

Whenever the magnet 22 is energized, the armature is moved downwardly thus raising the pawl 105 and turning the ratchet wheel 102 the space of one tooth and thereby turning ratchet wheel 103 an equal angular distance to actuate the platen 65.

The type wheel 14 is inked by an inking roller 110, carried by angular extensions of the arms 32. The roller 110 is inked in turn by a wick 111, extending from an ink reservoir 112, upon each movement of the type wheel across the machine.

Although circuit arrangements have been devised for operating the printing mechanism from a single circuit, the particular printer shown is normally operated over two independent circuits, the press magnet 22 and escapement magnet 25 being connected in one circuit and the letter spacing magnet 29 being connected in another circuit.

Current alternations are transmitted over the first line to successively actuate the polarized escapement magnet 25 and thereby step the type wheel to bring the desired character into printing position opposite the platen 65, whereupon a prolonged impulse is transmitted, to which the press magnet 22 responds. As the magnet 22 draws down its armature, the lever 106 and pawl 105 are elevated, thereby turning the ratchet wheel 102 and 103, the space of one tooth. The ratchet 103 acts on the pawl 98 and momentarily lifts the arm 97, throwing the platen 65 against the type wheel. The platen is returned, after the impression has been taken, by the spring 104.

Concurrently with the prolonged impulse, the circuit including the magnet 29 is closed to energize magnet 29 thus drawing down the armature 46 and thereby raising the pawl 42, so as to position it in the succeeding tooth of the ratchet wheel 41. After the completion of the printing stroke, the magnet 29 is de-energized, thus permitting the pawl 42 to move downward under the action of its spring. This movement of the pawl turns the wheel 41 and with it the shaft 40, thus causing the drums 38 and 39 to rotate, one to play off and the other to wind up the cords 34 and 35, respectively, so as to move the type wheel one letter space towards the right of the machine. A second group of current alternations may then be transmitted to the polarized magnet 25 to position the type wheel for the second character and the printing cycle repeated.

The printing of characters across the web or page is continued until the end of the line is reached or until it is desired to return the type wheel for the beginning of a new line. The return of the type wheel to start a new line is effected by opening the circuit through the escapement magnet, while that through the magnet 29 is kept closed whereupon, through mechanical connections not shown, the shaft 51 is rocked in a clockwise direction to cause the arm 50 to disengage the pawl 42 and the lever 54 to disengage the detent 47, thus releasing the wheel 41 and permitting the spring 49 to rotate in a direction to wind the cord 34 on the drum 38.

The paper is fed forward one line space during the interval in which the type wheel is being returned to the left, since the lever 54 moves out of engagement with the wheel 75 at the same time that the pawl 42 and detent 47 are disengaged.

It will be noted that the platen 65 is located adjacent the top of the type wheel 14 and close to the roller 63 and that the space behind the web 76, between the rollers 63 and 66 is unobstructed by any part of the printing apparatus. The forward feed of the paper is adjusted by means of the stop screw 83 so that as each line of printing is completed it is advanced from beneath the platen to a position just above the roller 63 and within the field of the projecting system C.

All of the characters are disposed in a single row on the face of the type wheel and there is no movement of the paper, either upward or downward, to effect a case shift, during the printing of a line. Consequently the image of the successive lines remain stationary on the screen during the entire period of printing a line, rendering the same easy to read.

Figure 4:
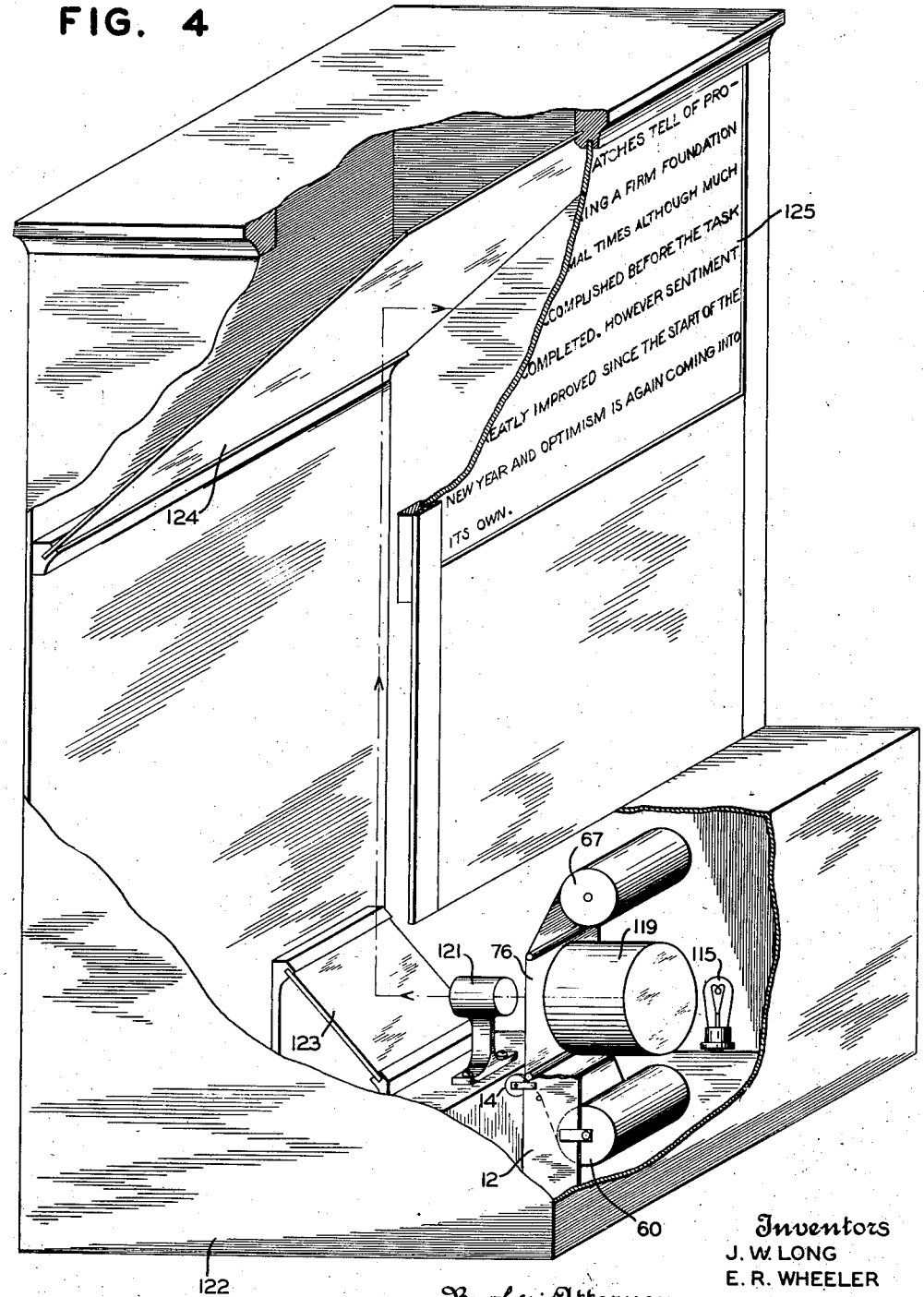
Figure 4 is a perspective view partially cut away of a projecting cabinet enclosing the apparatus of Figures 1, 2, and 3.

The illuminating system comprises any suitable source of light 115 (see Figure 4), and a condensing lens series 116 consisting of a pair of plano-convex lenses 117 and 118 contained within a lens holder 119, carried from the angle members 120 secured to the side plates 11 and 12. A water cell may be provided between the lenses 117 and 118 if desired. The lens 118 is substantially co-extensive with the area of the web 76 to be projected and serves in conjunction with the lens 117 to direct the light from the light source uniformly over the surface of the web. It is understood, of course, that the web is composed of some suitable transparent or translucent material, such as specially prepared paper, cellophane or similar material. Obviously, in place of transmitting the light through the web, the printing may be projected by reflection from the web, in which case an opaque web would be used.

Located at the opposite side of the web from the condensing lens system and at the proper focal length therefrom is an objective lens series 121, of any suitable type. The printing and projecting apparatus is arranged in the base of a cabinet 122, the light passing from the lamp 115 towards the rear of the cabinet, through the condensing lens series, web 76 and objective lens series 121. The image is reflected upward by a mirror 123 and thence forward by the mirror 124, upon the rear of a translucent screen 125, forming a panel in the front wall of the cabinet.

The screen is of such width and height as to permit a number of successive lines of printing to be shown thereon simultaneously in greatly enlarged characters, the printed matter passing step by step upwardly across the screen, as each new line is fed forward from the printing positions.

Inasmuch as each line appears on the screen as soon as the printing of the line is completed, there is substantially no lag between printing and projection and therefore the transmission may be interrupted at the completion of any line without leaving printed matter on the web still unprojected.

It is obvious that the last character of each line will pass into the field of the projector directly after printing. The same apparatus may also be employed as a tape printer by eliminating the mechanism for shifting the type wheel transversely of the tape and advancing the tape after printing each character. In this event, each character, as it is printed, will be brought directly into the field of the projector.

With the arrangement of platen and type wheel shown, the spacing of the printed lines, in order to bring each line into the field of the projector as it is completed, corresponds approximately to double spacing. This spacing is preferred in order to render the projected image easily readable at a distance. If desired, however, the spacing may be adjusted for other inter-line distances, as for instance, single spacing, in which case there will be one line lag between printing and projecting. However, since it is desirable to separate each paragraph or item by double spacing, it is evident that interruptions in transmission between separate paragraphs will not leave any unprojected printed matter on the web.

It will be noted, therefore, that we have produced a printing telegraph page projector in which each line of printed matter passes immediately from the printing position into the field of the projector so as to appear upon the screen. This apparatus is particularly adapted to provide continuous news service, in such places as brokers' offices, hotels, restaurants, etc., or it may be employed in railway stations, public buildings, employment agencies, etc., for annunciating.

Obviously various changes and modifications may be made in the apparatus disclosed and various forms of printing and projecting apparatus employed without departing from the invention and we contemplate all such modifications and changes as come within the scope of the appended claims.

What we claim is:

1. A printing telegraph projector comprising a type printing mechanism, a transparent or translucent web, means for printing transversely of said web in successive lines, a projecting apparatus disposed above said printing mechanism and arranged to project light through said web and means for feeding said web so as to bring each line of printing in a single step directly from the printing position into the field of said projector.

2. A printing telegraph projector comprising a type page printing telegraph mechanism, a web therefor, a projecting system disposed above said printing telegraph mechanism and arranged to project light through said web and means for feeding said web in a continuous movement from the printing position into the field of said projector.

3. A printing telegraph projector comprising type printing telegraph mechanism, a web therefor, a projecting system disposed above said printing mechanism, means for printing on said web and means for feeding said web outside of the field of the projector from the printing position into the field of said projector without intermediate printing thereon.

4. A printing projector comprising a type page printing machine having a definite line printing position, a web, a take-up mechanism for said web spaced above said machine, a projecting apparatus intermediate said machine and take-up mechanism, having an unobstructed field extending to adjacent said line printing position and means for feeding the web in a single movement past said line printing position and through said projection field.

5. In combination a printing telegraph machine, a web, a type wheel for printing transversely of said web in successive lines, a platen normally spaced relatively close to said type wheel and movable thereagainst by a relatively short stroke, a projector having an unobstructed field extending adjacent to said type wheel and disposed thereabove and means for feeding said web through said field.

6. In combination a printing telegraph machine having a radially stationary type wheel, a movable platen cooperating therewith to effect printing and a web extending between said type wheel and platen, a projector disposed above said printing machine and having a field extending closely adjacent said type wheel and means for deflecting the web from adjacent said platen into the field of said projector.

7. In combination a printing telegraph machine having a type carrier, a platen normally relatively closely spaced therefrom and a web extending across said platen, a projector disposed above said printing mechanism and having a field extending closely adjacent the printing position of the machine and means for deflecting said web from adjacent said printing position into the field of said projector.

JAMES W. LONG.
EVAN R. WHEELER.